United States Patent
Haytayan

(10) Patent No.: US 6,676,353 B1
(45) Date of Patent: Jan. 13, 2004

(54) SELF-DRILLING, SELF-TAPPING SCREWS

(76) Inventor: Harry M. Haytayan, 32 Indian Rock Rd., Nashua, NH (US) 03063

( * ) Notice: Subject to any disclaimer, the term of this patent is extended or adjusted under 35 U.S.C. 154(b) by 0 days.

(21) Appl. No.: 10/195,216

(22) Filed: Jul. 15, 2002

(51) Int. Cl.[7] .................... F16B 15/08; F16B 25/10
(52) U.S. Cl. .................... 411/442; 411/387.2; 411/399; 206/346; 206/347
(58) Field of Search .................... 411/387.1, 387.2, 411/387.5, 387.6, 387.7, 387.8, 399, 442; 206/345, 346, 347

(56) References Cited

U.S. PATENT DOCUMENTS

| | | | |
|---|---|---|---|
| 4,040,554 A | | 8/1977 | Haytayan .................... 227/8 |
| 4,655,661 A | * | 4/1987 | Brandt .................... 411/399 X |
| 5,046,396 A | * | 9/1991 | Pfister .................... 411/442 X |
| 5,516,248 A | * | 5/1996 | De Haitre .................... 411/387.2 |
| 5,645,208 A | | 7/1997 | Haytayan .................... 227/8 |
| 5,788,445 A | * | 8/1998 | Huang .................... 411/442 |
| 5,931,298 A | * | 8/1999 | Huang .................... 411/442 X |
| 5,984,096 A | | 11/1999 | Shinjo .................... 206/347 |
| 6,036,013 A | * | 3/2000 | Chen .................... 411/442 X |
| 6,106,208 A | * | 8/2000 | Lin .................... 411/387.2 X |
| 6,109,144 A | | 8/2000 | Muro .................... 81/434 |
| 6,139,236 A | | 10/2000 | Ito .................... 411/30 |

OTHER PUBLICATIONS

Muro North America, Autofeed Screwdriver Systems, website printout of screws.
Muro North America, Autofeed Screwdriver Systems, website printout of FLVL41 Power Driver.

* cited by examiner

*Primary Examiner*—Neill Wilson
(74) *Attorney, Agent, or Firm*—Pandiscio & Pandiscio

(57) ABSTRACT

A clip of fasteners for use in attaching a structural panel to a metal substrate comprises a plastic strip with openings characterized by inwardly-extending ribs for gripping and supporting fasteners that comprise a forward self-drilling portion and a rearward self-tapping thread portion. Each fastener has a head with a top surface adapted for driving engagement by a driver tool for rotatively driving the fastener, and a tapered surface having a plurality of circumferentially spaced cutting edges that function to cut away the ribs supporting the fastener as the fastener is rotatively driven through the structural panel to secure the panel to the substrate and create a countersink in the structural panel.

15 Claims, 4 Drawing Sheets

SELF-DRILLING, SELF-TAPPING SCREWS

FIELD OF THE INVENTION

The present invention generally relates to attaching structural elements with fasteners, and more particularly to a novel fastener and method for fastening structural elements together with fasteners.

BACKGROUND OF THE INVENTION

It is well known to use screws and nails, or similar pin-type fasteners, for securing floor, wall and ceiling panels to supporting structures in buildings and vehicle cargo container bodies. In the case of truck trailer bodies, hard wood floors are attached to a metal frame or substrate. The typical truck trailer body has a steel frame, and the hardwood flooring is secured to the steel frame with metal fasteners. The existing technology for securing floors to truck trailer bodies requires pre-drilling holes in both the wood flooring and the underlying metal frame, e.g., steel angle irons or junior I-beams, and using a powered screwdriver to drive to apply self-tapping screws through the pre-drilled holes to anchor the flooring to the frame. In some cases, vehicle cargo bodies or personnel-containing structures, e.g., mobile homes, may use aluminum framing. Since aluminum frame members are more easily penetrated than steel frame members of the same thickness, wood flooring and wall and ceiling panels may be attached to aluminum framing by means of nail-type pins with spiral grooves disposed along a portion of their length, with those pins being driven through the flooring and into aluminum frame members by means of a pneumatic high impact nail driver, e.g., a driver as disclosed in my U.S. Pat. No. 5,645,208, issued Jul. 8, 1997 and 4,040,554, issued Aug. 9, 1977.

However, using a pneumatic high impact nail driver has certain limitations with respect to applications involving hard wood flooring and steel framing. For one thing, the high impact produced by such a driver tends to split the hardwood flooring. Also, some steel framing members are too thin which causes bending of the steel substrate by the fasteners under the force exerted by the high impact driver. Moreover, since it is strictly a hammer-like impact procedure, when a fastener is driven through the floor into an underlying high tensile strength frame member, the fastener may or may not be driven properly to force the flooring member into a tight fit with the frame, resulting in it not passing inspection requirements. Consequently the procedure using predrilled holes and self-tapping screws has become standard industry practice. In an attempt to avoid the necessity of pre-drilling the underlying frame members, driver/fastening systems have been conceived that utilize special high carbon steel self-drilling, self-tapping screws and a high torque rotary screwdriver. However, for the most part, those systems function satisfactorily only if the underlying metal to be penetrated is a mild steel, e.g., A-36 steel, and has a maximum thickness of about ⅛" or less. A further impedance to use of self-drilling screws is that currently trailer body manufacturers are preferring to use a high tensile strength steel having a tensile strength of 80,000 psi and a yield strength of approximately 50,000–65,000 psi. It is difficult to reliably penetrate that steel in a thickness of ⅛", since in the process of attempting to do so the screws tend to burn due to the heat buildup. Therefore, there has existed a need for an improved fastening method and apparatus which can reliably attach wood flooring to high tensile strength steel substrates having a thickness in the order of ⅛" or thicker. Such a method and apparatus is described and illustrated in my copending U.S. patent application Ser. No. 10/195,207, filed on even date herewith for "Method And Apparatus For Attaching Structural Components With Fasteners". That method and apparatus involves use of a pneumatic rotary impact torque driver, such as the Model 2131 pneumatic driver made by Ingersoll-Rand Co. of 200 Chestnut Ridge Road, Woodcliff Lake, N.J. 07675, and self-drilling, self-tapping fasteners. That copending application is incorporated herein by reference.

Objects and Summary of the Invention

One object of the invention is to provide a novel fastener for attaching structural-components, such as hard wood flooring panels, to metal substrates, the fastener combining self-drilling and self-tapping capabilities.

Another object of the invention is to provide a clip of fasteners for use with the powered torque driver apparatus disclosed in my copending U.S. patent application Ser. No. 10/195,207 or other torque drivers, the clip comprising a plastic fastener-retaining strip adapted to be supported by and move along a fastener magazine or holder into fastener-driving position relative to a driver associated with the magazine, and a plurality of self-drilling, self-tapping screw fasteners supported by the plastic strip, with the fasteners being formed so as to facilitate their removal from the plastic strip when being driven into fastening relation with structural components.

These and other objects are achieved by providing a plurality of fasteners that are formed so as to have a pointed tip, a first self-drilling portion contiguous with the pointed tip, a second self-tapping screw portion contiguous with the first drilling portion, and a head that is adapted to be rotatively driven by a torque driver. The fasteners are mounted in a plastic strip comprising a plurality of sleeve sections, each gripping and supporting a single fastener. Each fastener is formed with cutting elements around its head that operate to cut through fastener-retaining elements of the supporting strip as the fastener is driven into a work piece consisting of at least a structural component made of wood or metal and a metal substrate. Each fastener is driven into the workpiece by engaging the head of the fastener with a tool bit attached to a rotary impact driver, and operating the driver so as to rotatively drive the first self-drilling portion of the fastener into the structural component and cause that drilling portion to drill a hole through said component, and then rotatively impact drive the fastener so as to cause said fastener to penetrate and drill a hole through said substrate and make a screw connection with the substrate. Other features and advantages of the invention are described or rendered obvious by the following detailed specification.

THE DRAWINGS

Figure 1:
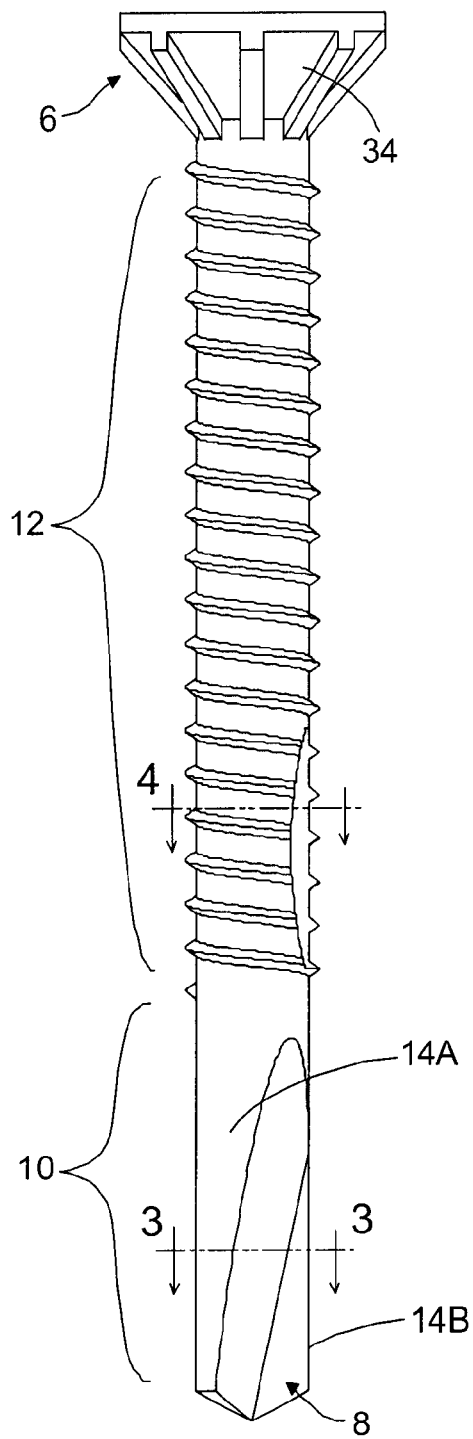
FIG. 1 is a side view in elevation of a fastener embodying the present invention.
Figure 5A:
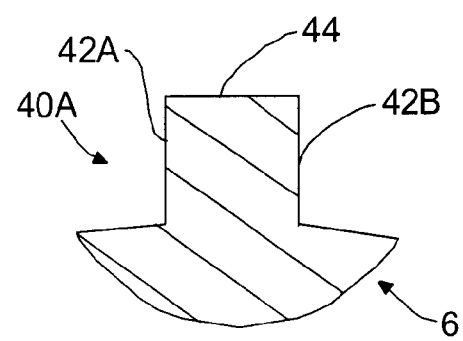
Figure 5B:
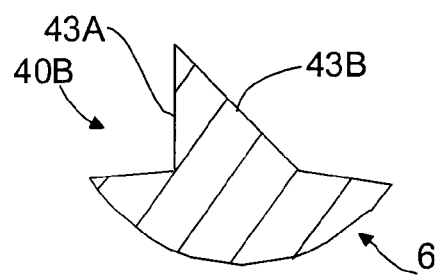
Figure 4:
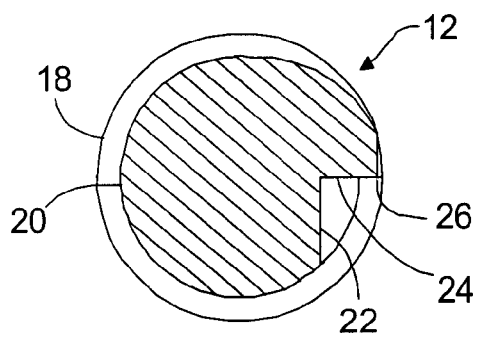
Figure 3:
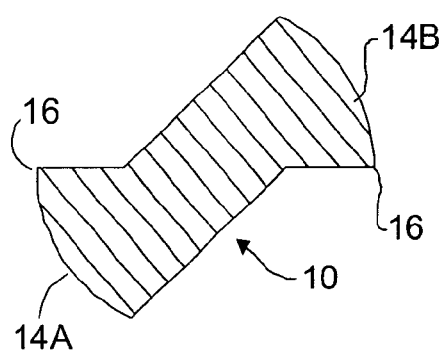
Figure 2:
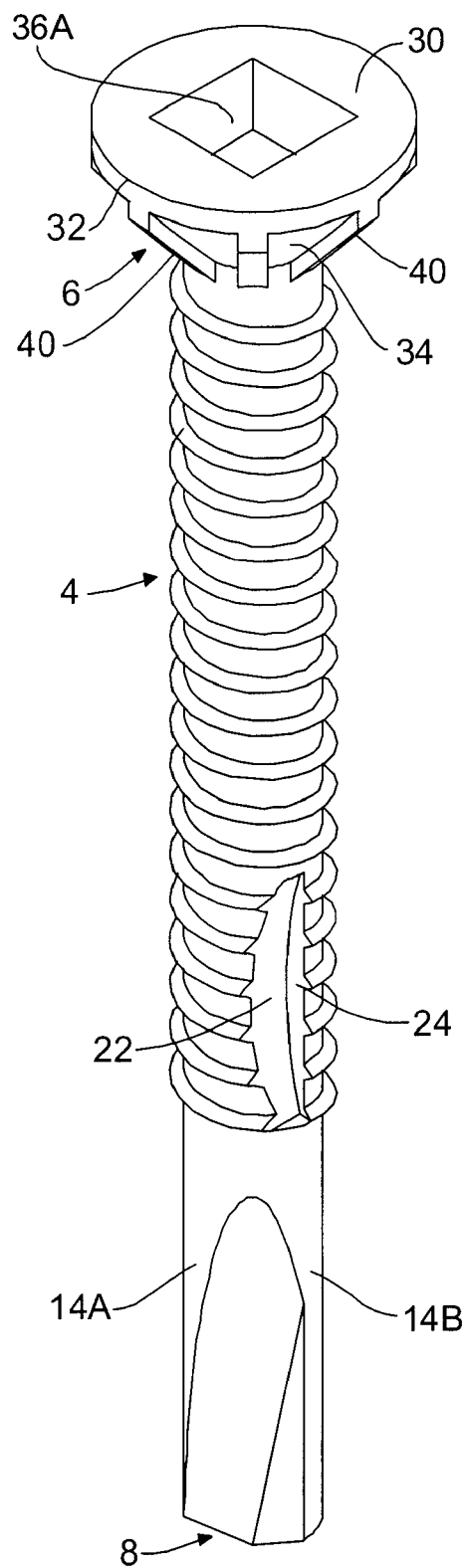
FIG. 2 is a perspective view of the same fastener.
Figure 6:
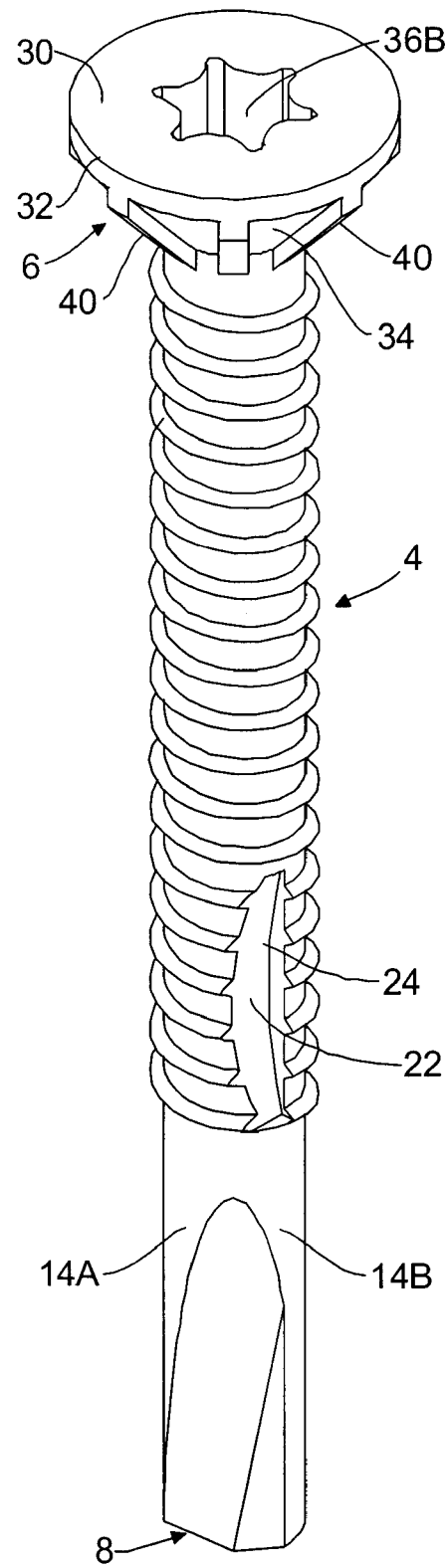
Figure 7:
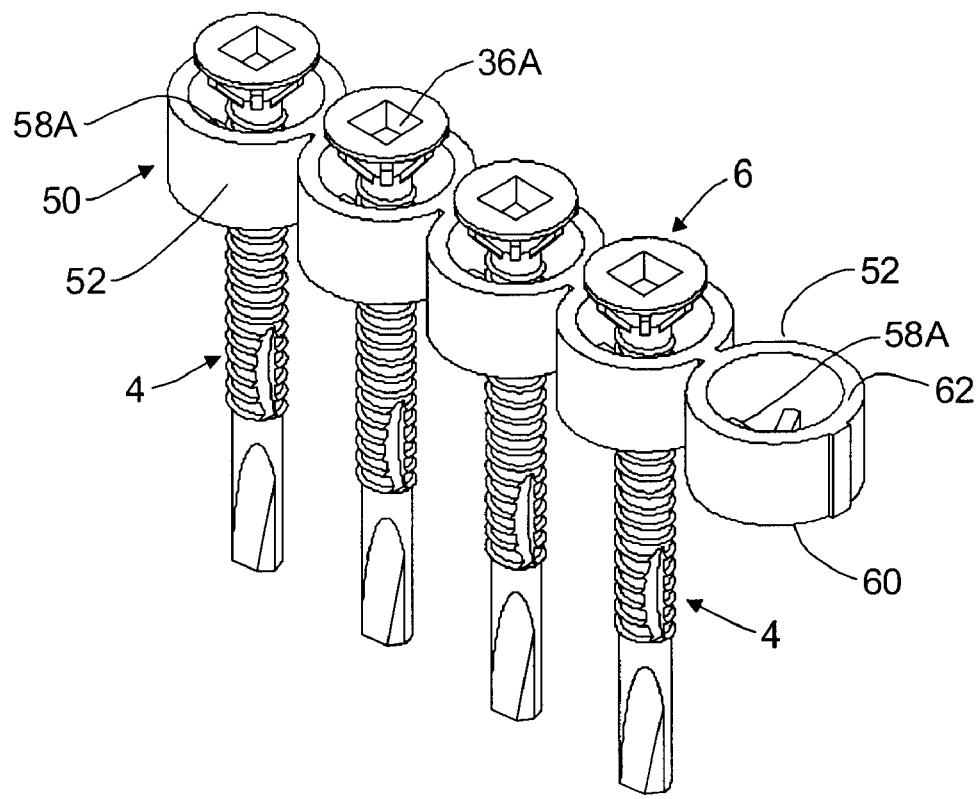
Figure 8:
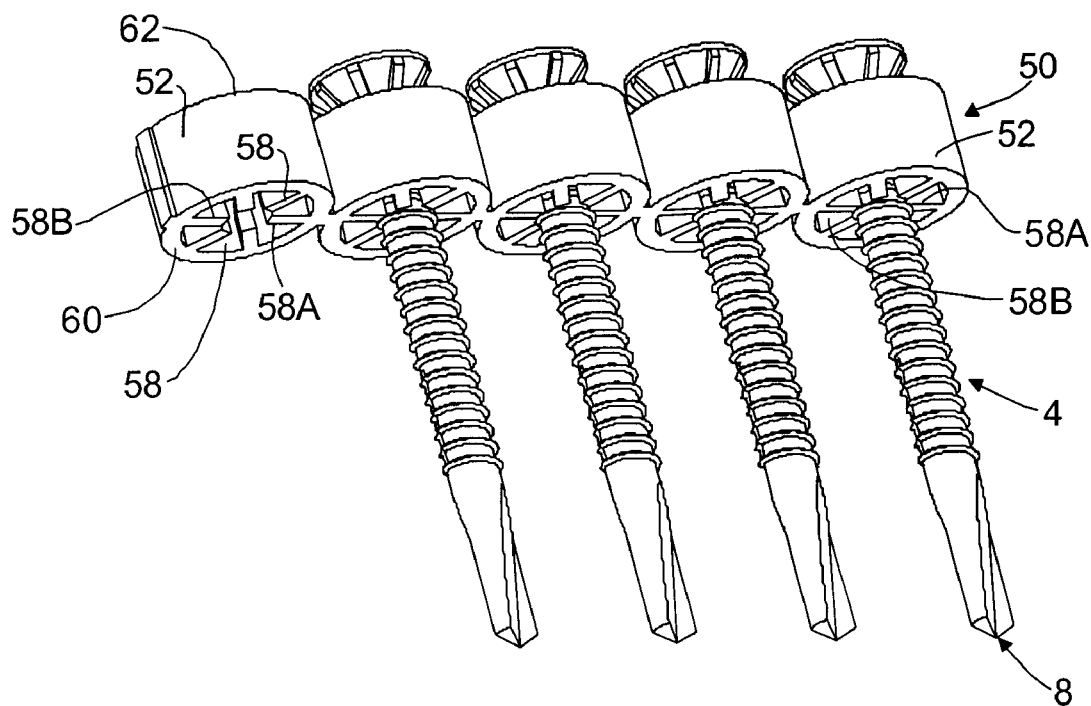
Figure 9:
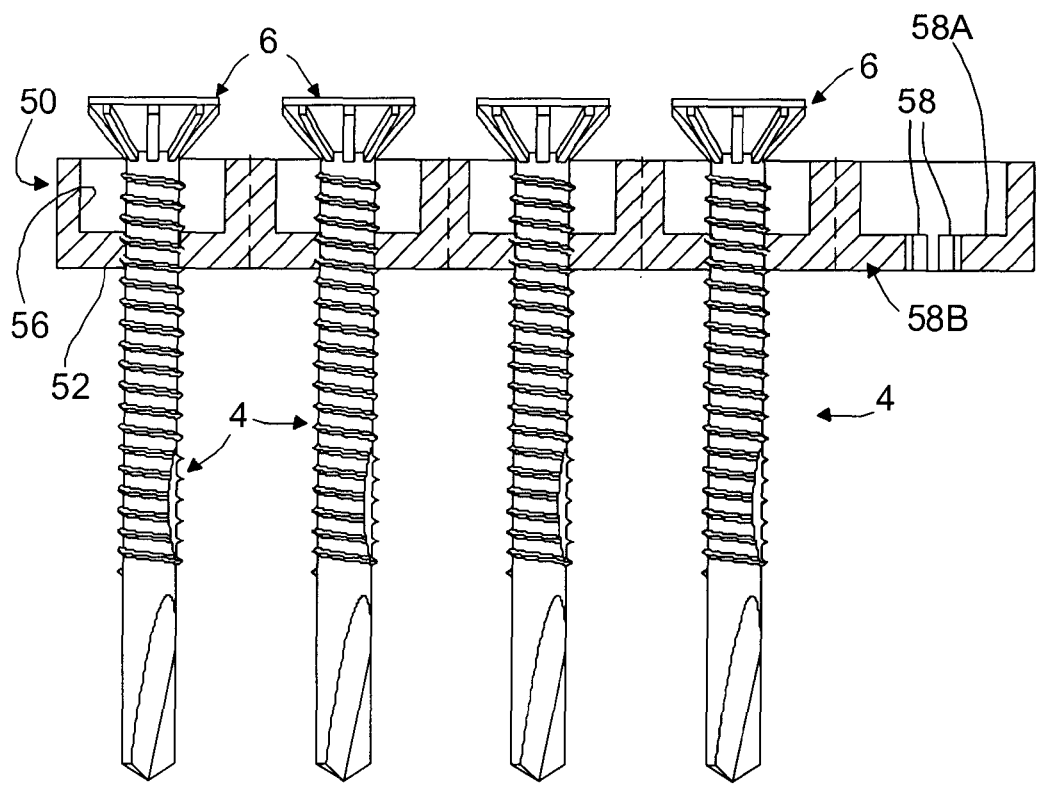
Figure 10:
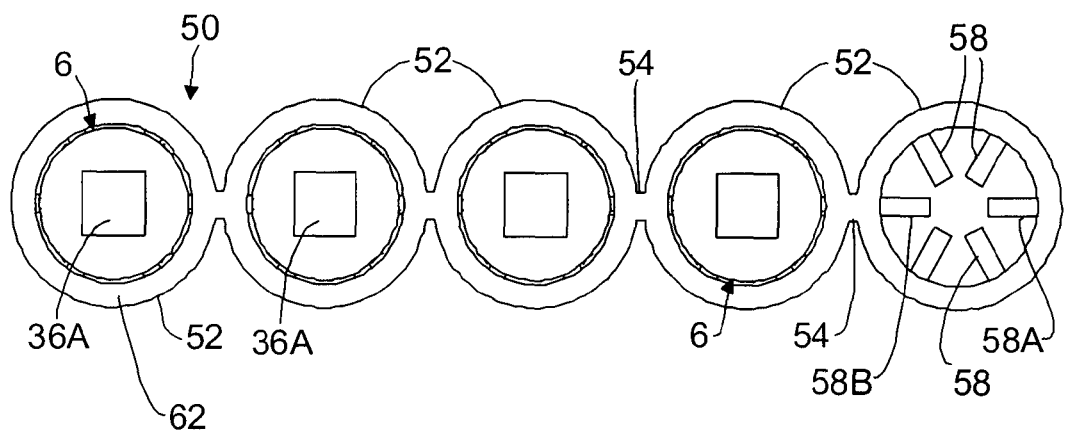

FIGS. 3 and 4 are cross-sectional views taken along lines 3—3 and 4—4 of FIG. 1;

FIGS. 5A and 5B are fragmentary cross-sectional views illustrating two different shapes of cutting ribs that may be formed on the head of the fastener;

FIG. 6 is a view like FIG. 2 of an alternative embodiment of the fastener;

FIGS. 7 and 8 are perspective views showing a portion of a clip consisting of a plurality of the same fasteners supported by a plastic strip;

FIG. 9 is a longitudinal center line sectional view of the clip shown in FIGS. 7 and 8; and FIG. 10 is a plan view of the same clip.

DETAILED DESCRIPTION

Referring to FIGS. 1–5, the illustrated fastener comprises a shank or shaft 4, a head 6 and a pointed tip 8. Preferably the tip has an apex angle in the range of about 110° to about 120° so as to facilitate piercing steel or other metal as hereinafter described. Shaft 4 comprises a forward self-drilling portion 10 and a rearward screw portion 12. The forward portion 10 comprises two helical cutting flutes 14A and 14B that are in diametrically-opposed relation to one another. Flutes 14A and 14B commence at pointed tip 8 and extend backwards for a predetermined distance. One side of each flute terminates in a sharp helical cutting edge 16. Cutting flutes 14A and 14B enable the forward portion 10 to function as a drill.

The rearward portion 12 is characterized by a screw thread 18 that commences at the rearward end of cutting flutes 10, 12 and preferably extends to where the head 6 joins the shaft. However, it is contemplated that screw thread 18 may terminate short of the head. Screw thread 18 has a triangular shape in cross-section, so that the thread has a sharp cutting edge. Preferably the thread has a pitch angle in the range of about 57° to about 63° and a flat root 20. The maximum diameter of screw portion 12 exceeds the maximum diameter of drill portion 10, so that screw thread 18 can cut a screw thread in the hole formed in a metal structural member by drill portion 10.

At the point where screw thread 18 meets the trailing end of cutting flutes 14A and 14B, and commencing for a short distance toward the head 6, the fastener is provided with a longitudinally extending slot 22. Preferably, but not necessarily, the slot is formed with a radial cutter blade, whereby the base of the slot preferably has a circular curvature as shown. The slot is cut so that one side of the slot has a flat radially- and longitudinally extending surface 24 that intersects screw thread 18 in that region of the shaft and forms a longitudinally extending cutting edge 26 for the leading portion of screw thread 18, so as to enable the section of rearward portion 12 having slot 22 to function as a self-tapping screw.

The head 6 is formed with a flat top surface 30, a narrow side surface 32 and a tapered bottom surface 34. Top surface 30 is formed with a suitable recess for interlocking with a driver tool bit. Thus, for example, as illustrated in FIG. 2, the upper surface may be provided with a square recess 36A for receiving a square drive tool bit. Further by way of example, as shown in FIG. 6, top surface 30 may have a Torx® or six-lobe recess 36B for a tool bit.

Additionally, the tapered surface 34 is formed with a plurality of cutting ribs 40 (a total of eight ribs is preferred but not essential) which are spaced uniformly from one another about the circumference of tapered surface 34. Preferably, as shown in FIG. 5A, ribs 40 have a square or rectangular cross-sectional shape, with the outwardly extending opposite sides 42A and 42B of each rib extending on opposite sides of and parallel to an imaginary diametrically-extending plane, i.e., a plane that includes the center axis of the fastener and is equally spaced from sides 42A and 42B. The forward edges of flat sides 42A and 42B, i.e., more specifically, the corners formed by those sides with the flat outer side 44 of the rib, function as cutting blade edges depending on the direction of rotation of the fastener. Alternatively the ribs could be formed with a triangular cross-sectional shape as shown in FIG. 5B, with each rib having a first side 43A that extends outwardly like side 42A or 42B and a second side 43B that forms the hypotenuse of the triangle and extends from surface 34 to the outer edge of its first side. The corner formed by the intersection of the outer end of first side 43A with the second hypotenuse side 43B serves as a cutting blade edge. As shown in the drawings, the ribs extend down to the shaft 4.

Referring now to FIGS. 7–9, the fasteners are preferably mounted in a plastic mounting strip 50 that comprises a plurality of cylindrical sleeves 52 which are connected to one another in series. The strip is formed by injection molding and sleeves 52 are joined to one another by a web portion 54. Preferably, but not necessarily, the strip is molded of polyethylene, polypropylene or nylon and is of moderate density and flexibility. Preferably the web portion 54 is made as short as is possible within the limits of injection molding technology. By way of example but not limitation, the sleeves have an o.d. of about 0.5 inch and a height, i.e. the distance between the bottom and top end surfaces 60 and 62 respectively, of about 7/16 inch. The interior surfaces 56 of sleeves 52 have a constant diameter, except for the presence of a plurality of radially-extending fastener-retaining ribs 58. In its preferred embodiment, each of the sleeves 52 of strip 50 has six ribs 58 since that number of ribs has been found to provide the support required to keep the fastener aligned with the center axis of the sleeve. Problems in maintaining the fasteners axially aligned with the sleeves have been encountered with sleeves that have only three or four fastener-retaining ribs. Providing more than six ribs increases the resistance to removal of the fasteners from the sleeves in the course of driving the fasteners into a multi-component workpiece, e.g., a wood flooring panel and a metal substrate. A further advantage is derived from the fact that two of the fastener-retaining ribs of each sleeve of strip 50, identified as ribs 58A and 58B, are disposed in line with one another along the longitudinal axis of the strip. Preferably, as shown in FIGS. 8 and 9, the bottom ends of ribs 58 are flush with the bottom end surfaces 60 of the sleeves, but the bottom edge surfaces of the ribs may be recessed slightly, e.g., about 1/8 inch, above the level of the bottom surfaces 60 without affecting operation of the invention. Ribs 58 extend for only a small portion of the height of each sleeve, preferably no more than a half of the height of the sleeves as seen in FIG. 9. Ribs 58 have substantially identical radial dimensions, with their inner ends being tangent to a circle having a diameter which is 0.010 to 0.015 inch smaller than the maximum diameter of the threaded portion 12 of the fasteners, whereby to tightly grip the fasteners. The fasteners are mounted in the sleeves so that their heads 6 do not engage the upper end surfaces 62 of the sleeves. In this connection it is to be noted that the maximum outside diameter of head 6 is less than the diameter of the inner surface 56 of the sleeve in which it is mounted. Ribs 58 grip the threaded portion of the fasteners and hold them in the sleeves 52.

Mounting the fasteners in the plastic strip 50 facilitates automatically feeding the fasteners for application by a torque, driver device (not shown), with the automatic feeding being achieved by a magazine that comprises means for holding a clip of fasteners, i.e., a strip 50 filled with fasteners, and pusher means for advancing the strip so that each successive fastener in turn is located in position to be engaged by a tool bit attached to the torque driver device and driven by that tool bit out of strip 50 into structural components that are to be attached to one another. Such a magazine is described and illustrated in my copending application Ser. No. 10/195,207, cited supra. Having ribs 58A and 58B of each sleeve disposed in line with one another along the length of the strip has the effect of increasing resistance to deformation of the sleeves under the pressure exerted thereon by the pusher means that advances the clip of fasteners in the magazine. As noted previously, having six fastener-retaining ribs in each sleeve assures that the fasteners are axially aligned with the sleeves. Such alignment is important to facilitate rapid and reliable locking engagement of the driving tool bit with the recesses 36A or 36B in the heads of successive fasteners.

As noted above, the cutting flutes 14A and 14B of the forward portion 10 provide the fastener with a self-drilling capability, while the slot 18 coacts with the leading end of screw thread 18 to provide the fastener with a self-tapping capability. More particularly, if the fastener is driven into a workpiece consisting of two or more components that are to be secured to one another, with the driving being conducted by an axially-biased power-driven rotating tool bit, e.g., as described in my aforementioned copending application Ser. No. 10/195,207, the cutting flutes 14A and 14B will drill through the several components of the workpiece to form a starting hole, and when the forward portion of the screw thread 18 characterized by the slot 22 encounters the hole formed by the cutting flutes 10, 12, the sharp outer helical edge 26 of slot surface 24 will cause the leading turns of the screw thread to commence a tapping operation, whereby continued rotation of the fastener under the influence of an applied axial force in the direction of the workpiece will cause the screw thread 18 to form a mating screw thread in the surrounding surface that defines the starting holes formed by cutting flutes 14A and 14B.

Assuming that the fasteners are driven into a workpiece while carried by the strip 50, the axial and rotational forces exerted on the lead (first-in-line) fastener in the strip by the torque driver device tool bit will cause its cutting ribs 40 to rapidly chew away the plastic retainer ribs 58 of the sleeve 52 that surrounds that fastener. The removed pieces of ribs 58 will pass out of the lead sleeve as the fastener is driven out of the strip into the multi-component workpiece. Having the fasteners positioned with their heads elevated above the upper side of the plastic strip is advantageous in that it allows the screws to achieve a relatively high rotational speed before the cutting ribs 40 engage the plastic retaining ribs 58, thereby facilitating rapid cutting away of ribs 58. Also as each fastener is driven through a hard wood flooring panel into an underlying metal substrate, the cutting ribs 40 act to cut away portions of the flooring panel and thereby form a countersink to accommodate the head of the driven fastener, thereby permitting the upper surface of the fastener head to be flush with the upper surface of the flooring panel. Preferably the fasteners are driven so that their heads are below the upper surface of the flooring, so that they cannot impede sliding movement of goods along the flooring unless and until the flooring becomes worn. Further, with respect to the apparatus shown and described in my copending application Ser. No. 10/195,207, cited supra, having the fastener heads 6 spaced upwardly from the plastic strip allows the heads to act to position the fasteners so that each one in turn is aligned with the tool bit, thereby assuring that the tool bit will engage the recess 36A or 36B.

In addition to what is obvious from the foregoing specific description, a further advantage of the invention is that the fasteners provide exceptional holding strength when driven as herein described into attaching relation with wood/steel substrates, and can be removed by an unscrewing action. Another advantage is that the fasteners may be manufactured using a conventional screw machine, with the slot 22 being formed by the same screw machine or by another machine in a subsequent manufacturing operation. As a consequence, the cost of manufacturing the fasteners is modest, particularly in view of the economic benefits gained from using the fasteners in the manner described herein which eliminates the need to pre-drill one or more of the components that are to be secured to one another by the fasteners. A further advantage is that the screws may be made in different lengths and also different diameters. In the latter case the radial dimension of fastener-retaining ribs 58 and/or the diameter of sleeves 52 may need to be changed. The plastic strips 50 also may be made in different lengths to accommodate a selected number of fasteners. Of course, the fasteners may be applied with a torque driver of the type described even if they are not mounted in plastic strip 50.

It is to be appreciated that certain changes may be made without departing from the essence of the invention. For one thing, the side surfaces 32 of the fastener heads may vary in height; they even may be totally eliminated in the sense that bottom surface 34 can be extended so as to intersect top surface 30. Further by way of example, the slope of bottom surface 34 and ribs 40 may be changed relative to the fastener shaft, and the width of ribs 40 and the extent that they project from surfaced 40 also may be varied. The recesses 36A and 36B could be replaced with recesses shaped to receive and mate with a Phillips-type screwdriver bit, or a tool bit of other end configuration. It also is contemplated that the fasteners could be mounted so that the top surfaces 30 of the fasteners are substantially flush with the upper end surfaces 62 of sleeves 52. A further possible change is to replace strip 50 with a plastic strip that does not have discrete sleeves as shown but instead has straight opposite external side surfaces in place of the curved external sleeve-defining surfaces. That alternative strip would still have a series of openings with ribs like ribs 58 to support the fasteners in the manner described herein, and would function in the same manner as the strip 50. However, it suffers from the disadvantage of requiring more plastic material. It also is contemplated that the fasteners are not limited in use to attaching wood flooring panels to metal substrates. By way of example, the fasteners could be used to attach plastic or aluminum members to a steel substrate or to attach metal decking to a steel substrate. Still other changes and advantages of the invention will be obvious to persons skilled in the art from the foregoing description and the attached drawings.

What is claimed is:

1. A clip of fasteners for use in securing together two superimposed structural components, said clip comprising:

a plastic strip in the form of a plurality of identical sleeves attached to one another in single file, each of said sleeves comprising (a) a cylindrical wall having an inner diameter, an outer diameter, a top end and a bottom end, and (b) a series of fastener-gripping ribs formed integral with and extending radially inward from said wall, said fastener-gripping ribs having a top end that is spaced from said top end of said wall; and a series of fasteners each mounted in one of said sleeves, each of said fasteners comprising a shank having a tapered point at one end thereof and a head at a second opposite end thereof, said shank also having a drill portion comprising spiral cutting flutes that extend toward said head from said tapered point and a screw portion comprising a helical thread that extends from adjacent said flutes to adjacent said head, and said head extending outwardly beyond the periphery of said shank and having a top surface and a tapered surface, said top surface having means adapted for engagement by a driving tool for rotating said fastener in a direction to cause said drill portion to drill a hole in a workpiece and said threaded portion to screw into said substrate, and said tapered surface having a series of circumferentially spaced ribs adapted to function as cutting blades for cutting through said fastener-gripping ribs of said sleeves when rotated relative to said sleeves.

2. A clip of fasteners according to claim 1 wherein said ribs on said head have a tapered cross-sectional shape.

3. A clip of fasteners according to claim 2 wherein said ribs on the head of each fastener are characterized by a pair of side surfaces that intersect one another at an angle, and said ribs have an apex formed by said side surfaces that functions as a cutting edge.

4. A clip of fasteners according to claim 3 wherein said ribs on said head of each fastener extend to and join the outer surface of the shank of said each fastener.

5. A strip of fasteners according to claim 1 wherein each head of each fastener has a recess adapted to be operatively engaged by a tool bit for rotatively driving said each fastener into superimposed structural components.

6. A strip of fasteners according to claim 1 further including a slot in the shank of each fastener that intersects said screw thread of said fastener adjacent said flutes and forms a leading cutting edge for said screw thread so that the end of said threaded portion adjacent said flutes can function as a screw tap to provide a hole in a workpiece with a helical thread into which said threaded portion of said fastener can be screwed.

7. A clip of fasteners according to claim 1 wherein said plastic strip comprises a polymer selected from the group consisting of polyethylene, polypropylene, and nylon.

8. A clip according to claim 1 wherein the inner diameter of said cylindrical walls is equal to or greater than the diameter of said fastener heads.

9. A fastener clip for use in supplying fasteners to a driver tool, said clip comprising:
   a plastic strip comprising a plurality of fastener carriers attached to one another in series, each of said fastener carriers comprising (a) a cylindrical wall having an inner diameter and an outer diameter, a top end and a bottom end, and (b) a series of fastener-gripping ribs formed integral with and extending radially inward from said wall, said fastener-gripping ribs having a bottom end located substantially even with said bottom end of said wall and a top end that is spaced from said top end of said wall; and
   a series of fasteners each mounted in one of said carriers, each of said fasteners comprising a shank having a tapered point at one end thereof and a head at a second opposite end thereof, said shank also having a pair of spiral cutting flutes that extend from said tapered point and a helical thread extending from adjacent said flutes to adjacent said head, and said head extending outwardly beyond the periphery of said shank and having a top surface and a tapered bottom surface, said top surface having means adapted for engagement by a driving tool for rotating said fastener in a direction to cause said thread to screw into a substrate, and said tapered bottom surface having a series of circumferentially spaced ribs adapted to function as cutting blades for cutting through said ribs of said carriers when rotated relative to said carriers.

10. A fastener clip for use in supplying fasteners to a driver tool, said clip comprising:
   an elongate plastic strip comprising a top surface, a bottom surface, a series of mutually spaced openings aligned lengthwise of said strip, and a plurality of fastener-gripping ribs extending inwardly of each of said openings, said fastener-gripping ribs having a bottom end located substantially even with said bottom surface of said strip and a top end that is spaced from said top surface of said strip; and
   a series of fasteners each mounted in one of said openings, each of said fasteners comprising a shank having a tapered point at one end thereof and a head at a second opposite end thereof, said shank also having a pair of spiral cutting flutes that extend from said tapered point and a helical thread extending from adjacent said flutes to adjacent said head, and said head extending outwardly beyond the periphery of said shank and having a top surface and a tapered bottom surface, said top surface having means adapted for engagement by a driving tool for rotating said fastener in a direction to cause said thread to screw into a substrate, and said tapered bottom surface having a series of circumferentially spaced ribs adapted to function as cutting blades for cutting through said fastener-gripping ribs when rotated relative to said strip.

11. A clip according to claim 10 wherein said fasteners are disposed so that said heads have a maximum diameter less than the diameter of said openings.

12. A clip according to claim 10 wherein said fasteners are disposed so that said heads are elevated above said top surface of said strip.

13. A clip according to claim 10 herein the maximum diameter of the portion of said fastener that comprises said helical thread is greater than the maximum diameter of the portion of said fastener that comprises said cutting flutes.

14. A clip according to claim 10 wherein said strip is characterized by having six mutually spaced fastener-gripping ribs extending inwardly of each of said openings.

15. A clip according to claim 14 wherein two of said six ribs are aligned with one another lengthwise of said strip.

* * * * *

UNITED STATES PATENT AND TRADEMARK OFFICE
CERTIFICATE OF CORRECTION

PATENT NO.    : 6,676,353 B1   Page 1 of 1
DATED         : January 13, 2004
INVENTOR(S)   : Harry M. Haytayan It is certified that error appears in the above-identified patent and that said Letters Patent is hereby corrected as shown below:

<u>Column 8,</u>
Line 44, change "herein" to -- wherein --.

Signed and Sealed this

Thirtieth Day of March, 2004

JON W. DUDAS
*Acting Director of the United States Patent and Trademark Office*